United States Patent
Takahashi et al.

(10) Patent No.: US 6,662,683 B1
(45) Date of Patent: Dec. 16, 2003

(54) OIL CYLINDRICAL ROTATIONAL DAMPER

(75) Inventors: Shigeru Takahashi, Yokohama (JP); Naoto Jinbo, Yokohama (JP)

(73) Assignee: NIFCO Inc., Kanagawa (JP)

( * ) Notice: Subject to any disclaimer, the term of this patent is extended or adjusted under 35 U.S.C. 154(b) by 0 days.

(21) Appl. No.: 10/048,911

(22) PCT Filed: Aug. 3, 2000

(86) PCT No.: PCT/JP00/05208

§ 371 (c)(1),
(2), (4) Date: May 8, 2002

(87) PCT Pub. No.: WO01/10672

PCT Pub. Date: Feb. 15, 2001

(30) Foreign Application Priority Data

Aug. 5, 1999 (JP) .......................................... 11/222197
Aug. 9, 1999 (JP) .......................................... 11/224991

(51) Int. Cl.[7] .......................... G05G 3/00; F16D 57/00; F16D 57/06
(52) U.S. Cl. .......................... 74/573 F; 74/572; 74/574; 74/573 R; 188/290; 188/293; 267/140.11; 267/140.13
(58) Field of Search ................ 74/572–574; 267/140.13, 267/140.11; 188/290, 306, 276, 293; 62/187; 296/37.12, 37.9

(56) References Cited

U.S. PATENT DOCUMENTS

| 4,691,811 A | * | 9/1987 | Arakawa et al. ............. 188/290 |
| 4,796,733 A | * | 1/1989 | Nakayama ................... 188/291 |
| 4,893,522 A | | 1/1990 | Arakawa ...................... 74/574 |
| 5,211,267 A | * | 5/1993 | Clark ........................... 188/276 |
| 5,269,397 A | * | 12/1993 | Kawamoto et al. .......... 188/290 |
| 5,449,054 A | | 9/1995 | Wiese et al. ................. 188/296 |
| 5,497,863 A | * | 3/1996 | Schmidt et al. ............. 188/306 |
| 5,522,485 A | * | 6/1996 | Takahashi et al. .......... 188/306 |
| 5,887,930 A | * | 3/1999 | Klein ....................... 296/37.12 |
| 6,041,899 A | * | 3/2000 | Takamatsu ................... 188/290 |
| 6,240,735 B1 | * | 6/2001 | Kolson et al. ................. 62/187 |
| 6,464,050 B2 | * | 10/2002 | Smith et al. ............. 188/267.1 |
| 6,561,323 B2 | * | 5/2003 | Machida ..................... 188/293 |
| 2001/0017247 A1 | * | 8/2001 | Machida ..................... 188/290 |
| 2002/0101014 A1 | * | 8/2002 | Kurihara et al. ....... 267/140.13 |

FOREIGN PATENT DOCUMENTS

| DE | 3821982 | | 1/1989 | |
| DE | 4244484 | | 7/1994 | |
| DE | 29604260 | | 6/1996 | |
| DE | 29707759 | | 8/1997 | |
| GB | 2288450 A | * | 10/1995 | ............... 74/573 F |
| JP | 6-2727 | * | 1/1994 | ............... 74/573 F |
| JP | 2002-21902 | * | 1/2002 | ............... 74/573 F |

* cited by examiner

Primary Examiner—Vinh T. Luong
(74) Attorney, Agent, or Firm—Hogan & Hartson, LLP

(57) ABSTRACT

A damper is provided having an assist grip into which the damper is built. The damper includes a housing having an inner cylinder and an outer cylinder which disposed concentrically with each other and an annular space formed between the inner cylinder and the outer cylinder containing a viscous fluid; a cylindrical rotor accommodated in the housing and which receives a damping action from the viscous fluid; a ring-shaped sealing member for preventing viscous fluid leakage; and an annular cap provided independently of the rotor and mounted to the housing, and which retains the rotor and the sealing member in the housing. Another damper is provided that includes a housing which has an annular space containing a viscous fluid, the cylindrical rotor the annular cap, a ring-shaped first sealing member disposed between the rotor and the cap, and another ring-shaped second sealing member disposed between the rotor and the housing.

21 Claims, 13 Drawing Sheets

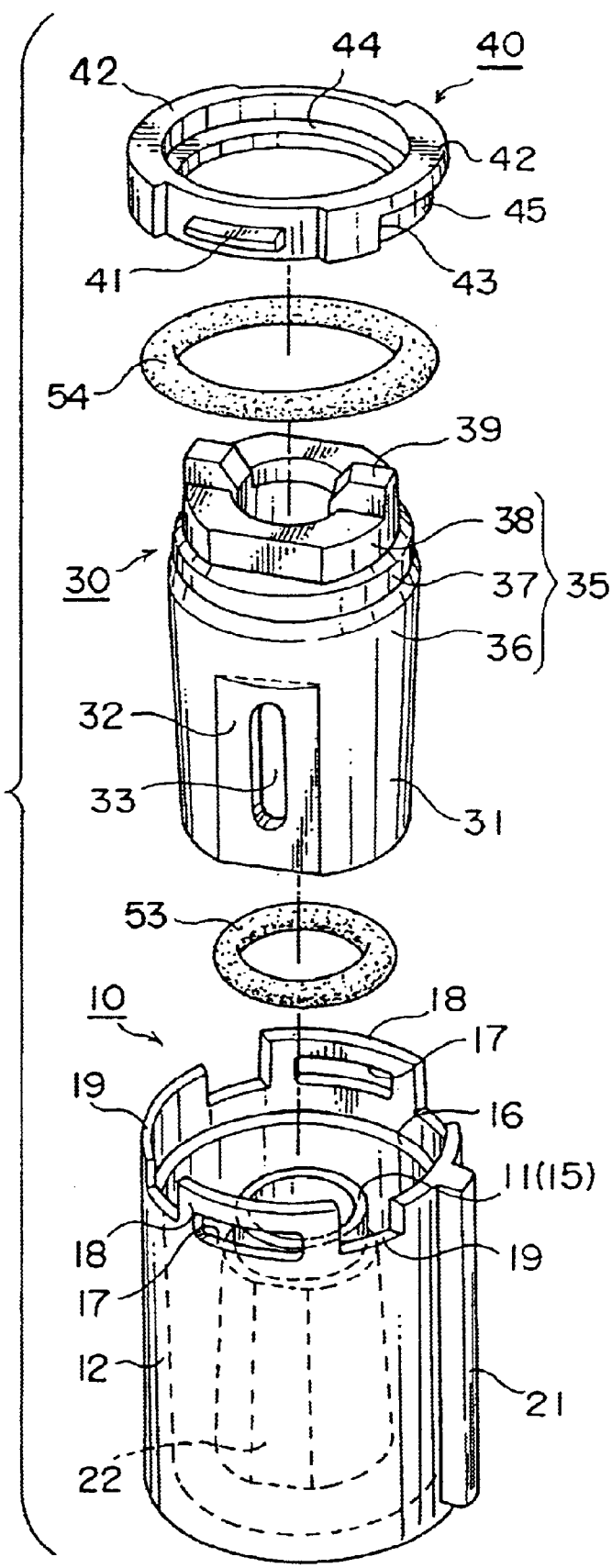

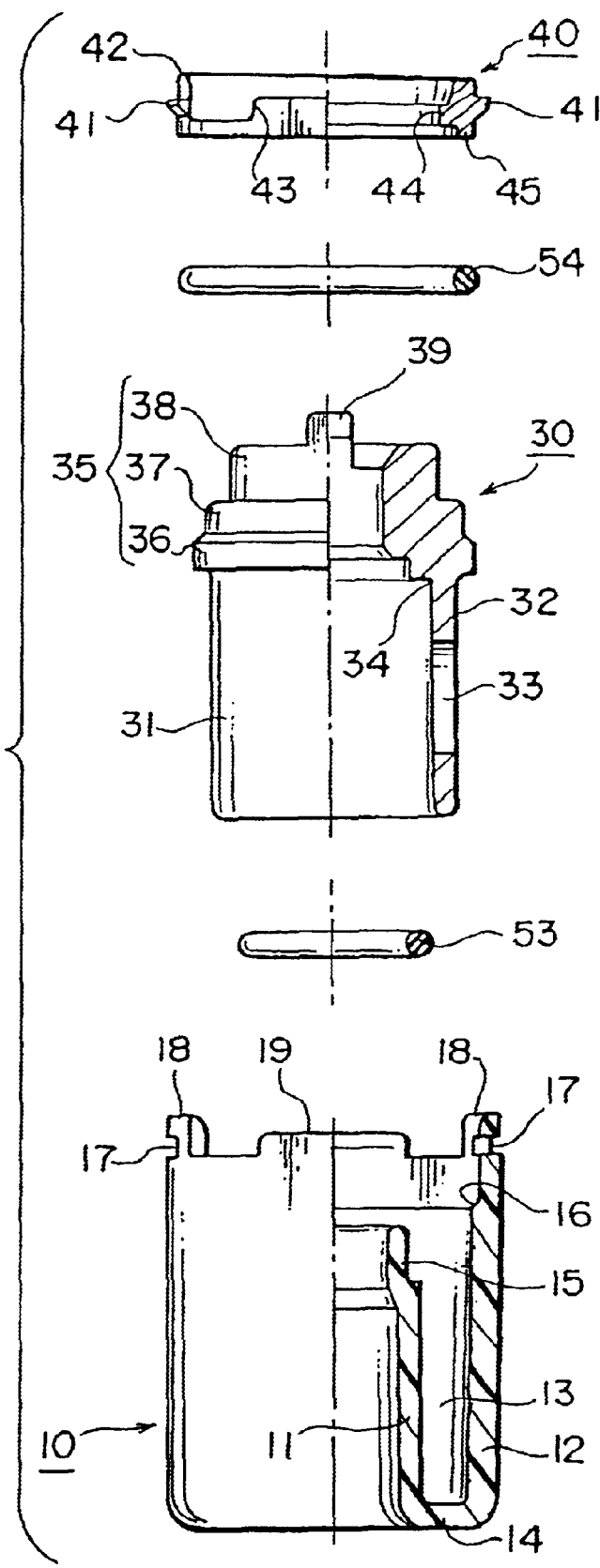

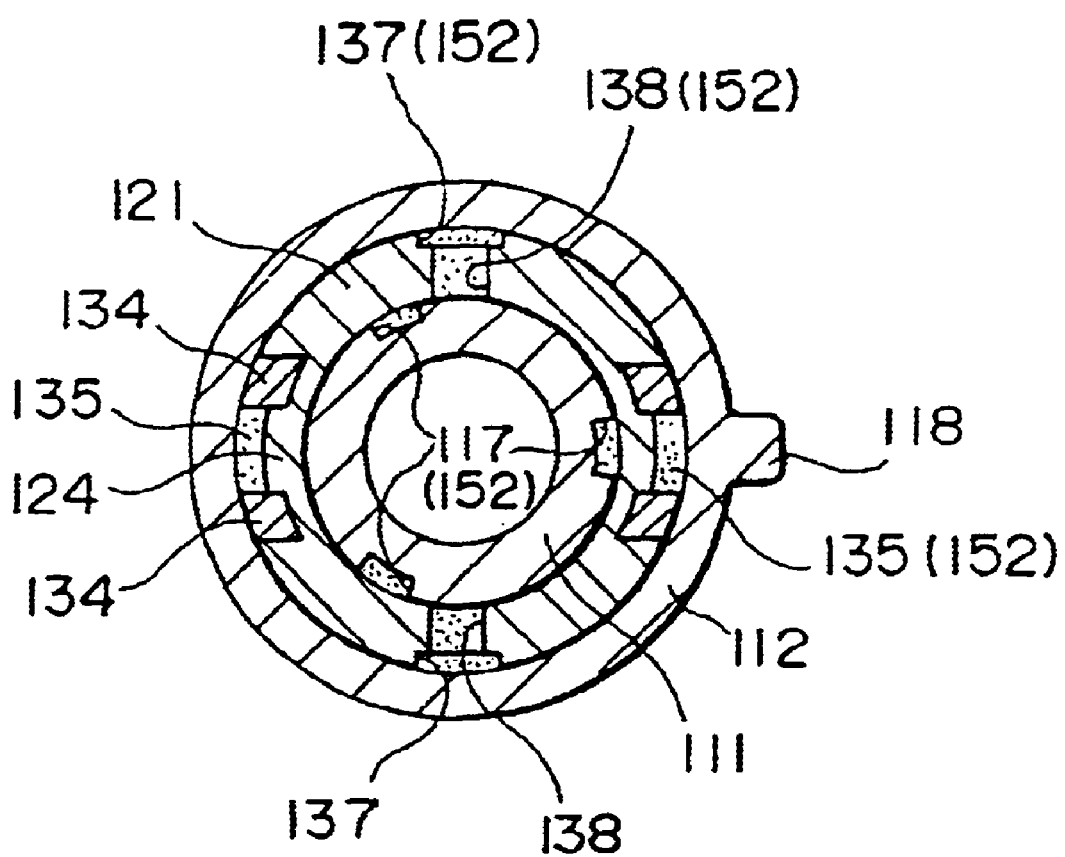

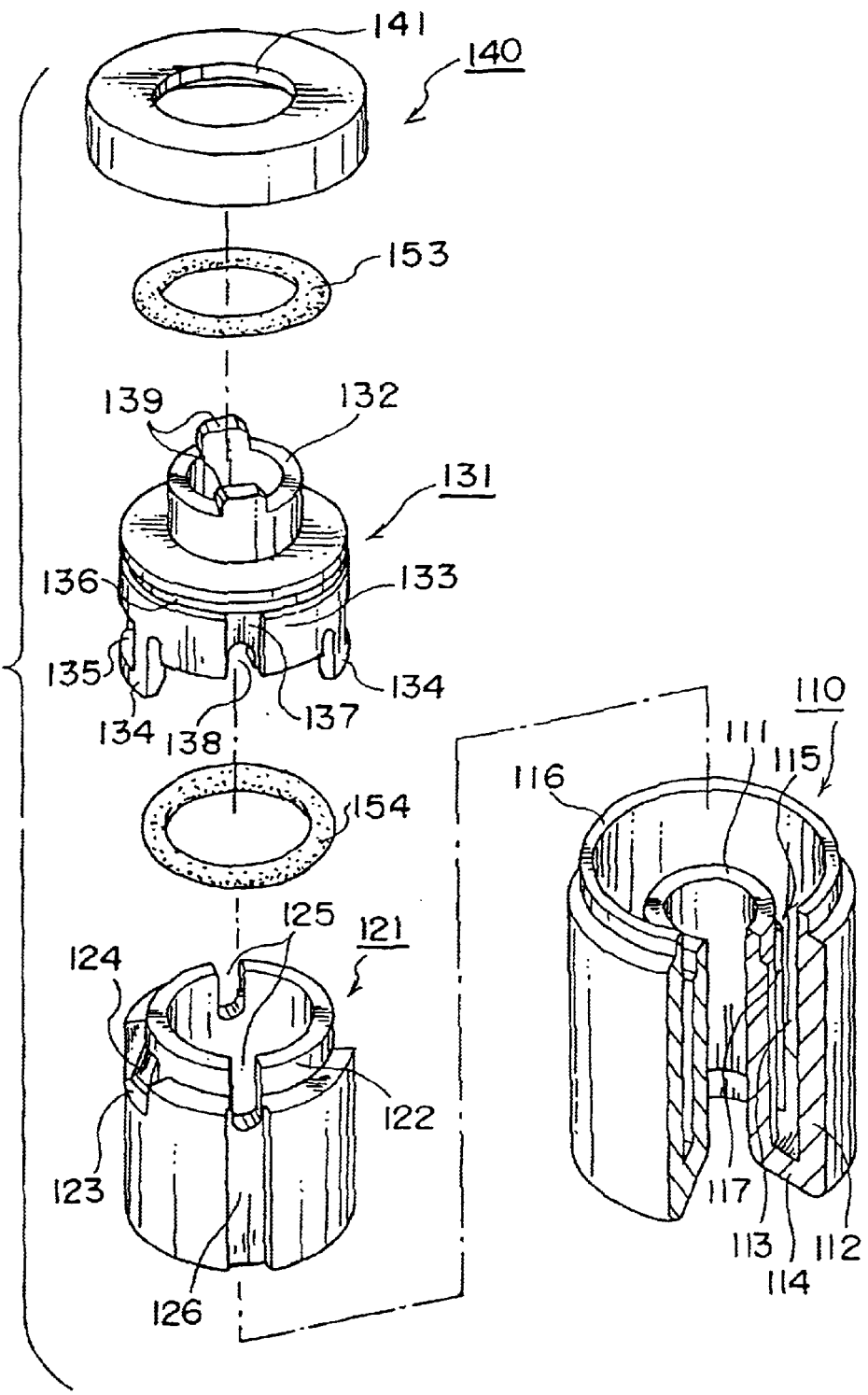

OIL CYLINDRICAL ROTATIONAL DAMPER

BACKGROUND OF THE INVENTION

1. Field of the Invention

The present invention relates to a so-called oil cylindrical rotational damper in which a viscous fluid such as a silicone oil damps its axial rotation, and an assist grip into which this oil cylindrical rotational damper is built-in.

2. Description of the Related Art

A conventional oil cylindrical rotational damper includes a housing which has an inner cylinder and an outer cylinder. The damper also includes an oil reservoir formed between the inner cylinder and the outer cylinder. The oil reservoir is filled with a viscous fluid. A rotor is provided which is immersed in the viscous fluid. The damper further includes two sealing members for preventing leakage of the viscous fluid, and a cap for pressing and holding the sealing members, wherein a shaft member is made to pass through the inner cylinder and the rotor.

In this conventional damper, the cap and the rotor are formed integrally with each other, and the cap engages with the housing in order to press and hold the sealing members.

However, since the rotor or the cap to which a load is applied is structured to press the sealing members and irregularity in the pressing force exerts an adverse effect on the sealing performance of the sealing members, stable, excellent sealing performance over a long period of time cannot be expected. Further, there is a possibility that adverse effects on the damping of the rotor (torque performance) may arise.

SUMMARY OF THE INVENTION

An advantage of the present invention is to provide a damper which can overcome the aforementioned conventional drawbacks, which is structured simply, which is made compact and light, and which is manufactured inexpensively, and an assist grip into which the damper is built.

In order to solve such problems as described above, in accordance with the present invention, there is provided a rotational damper including a housing having an inner cylinder and an outer cylinder disposed concentrically with each other and an annular space formed between the inner cylinder and the outer cylinder containing a viscous fluid. A cylindrical rotor is accommodated in the housing and receives a damping action from the viscous fluid. A ring-shaped sealing member is provided for preventing viscous fluid leakage. The damper also includes an annular cap provided independently of the rotor and mounted to the housing, and which retains the rotor and the sealing member in the housing.

There is provided another rotational damper. The damper ficludes a housing having an annular space containing a viscous fluid. A cylindrical rotor is accommodated in the housing and receives a damping action from the viscous fluid. An annular cap is provided independently of the rotor and engaged with the housing, which retains the rotor in the housing. A ring-shaped first sealing member is disposed between the rotor and the cap and a There is provided an assist grip including an arm supported so as to be rotatable between a first angular position during use and a second angular position during non-use, with the arm biased to return from the first angular position to the second angular position. The assist grip also includes a damper for damping arm rotation with the damper including a housing containing a viscous fluid; a cylindrical rotor accommodated in the housing for receiving a damping action from the viscous fluid, an annular cap having a central aperture and provided independently of the rotor, and which retains the rotor in the housing, a ring-shaped first sealing member disposed between the rotor and the cap, and a ring-shaped second sealing member disposed between the rotor and the housing. The cylindrical rotor includes a cylindrical head having an end side with a first hollow cylindrical portion threat. The first hollow cylindrical portion is passed through the central opening of the annular cap, with the first sealing member disposed between the first hollow cylindrical portion and the central aperture of the annular cap.

There is provided another assist grip. The assist grip includes an arm supported so as to be rotatable between a first angular position during use and a second angular position during non-use and biased to remain in the second angular position. The assist grip also includes a damper for damping rotation of the assist grip, the damper including a housing containing a viscous fluid; the housing having an inner cylinder, a cylindrical rotor accommodated in the housing and for receiving a damping action from the viscous fluid; an annular cap having a central aperture and provided independently of the rotor and which retains the rotor in the housing, shaped first sealing member disposed between the rotor and the cap, and a ring-shaped second sealing member disposed between the rotor and the housing. The cylindrical rotor is provided with a cylindrical head, having opposite ends and having a first hollow cylindrical portion at one of the end sides, the first hollow cylindrical portion being passed through the central aperture of the annular cap. The cylindrical rotor includes a second hollow cylindrical portion at the other end side of the cylindrical head. A portion of the inner cylinder of the housing enters into the second hollow cylindrical portion. The cylindrical rotor has a damping cylinder provided independently of the cylindrical head and the second sealing member is disposed between the second hollow cylindrical portion and the damping cylinder.

BRIEF DESCRIPTION OF THE DRAWINGS

FIG. 3 is an exploded perspective view of the damper.

FIG. 4 is an exploded semi-longitudinal sectional view of the damper.

FIG. 7C is a transverse sectional view of the damper as seen from the direction of an arrow along the line c—c of FIG. 7B.

FIG. 8 is an exploded perspective view of the damper.

DESCRIPTION OF THE PREFERRED EMBODIMENTS

Figure 1A:
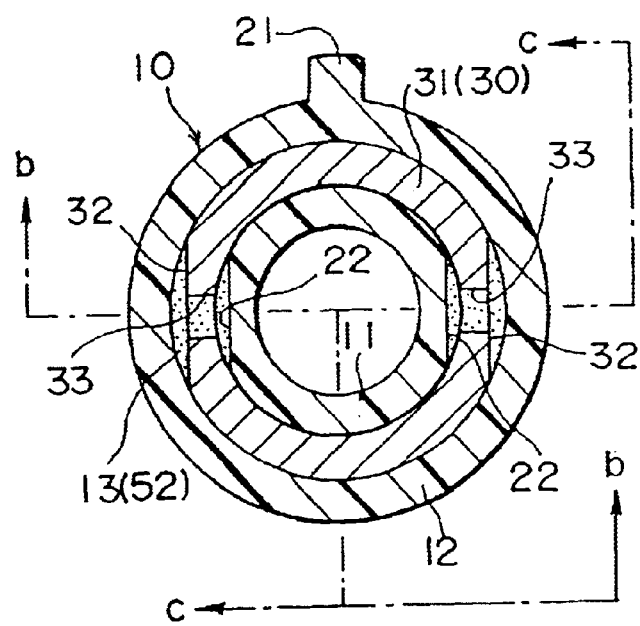
FIG. 1A is a transverse sectional view of a damper according to a first embodiment of the present invention as seen from the direction of an arrow along the line a—a of FIG. 1B.
Figure 1B:
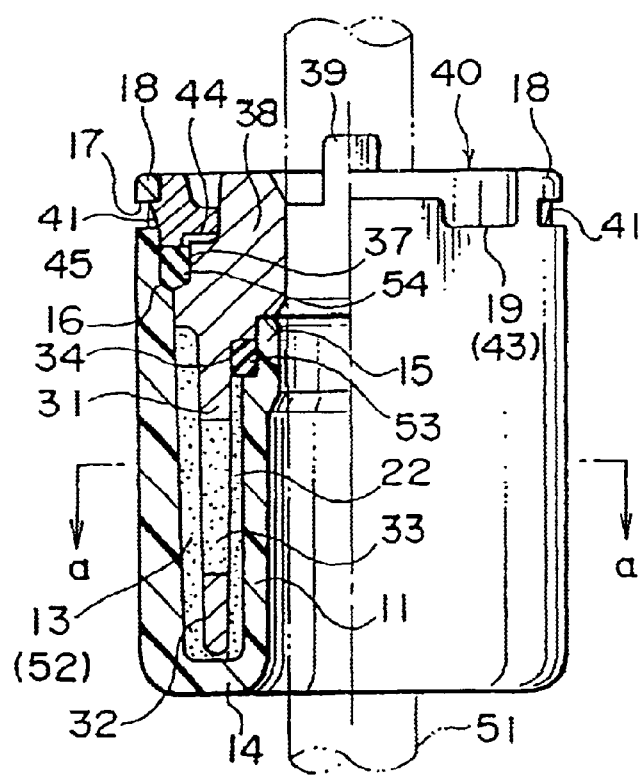
FIG. 1B is a semi-longitudinal sectional view of the damper as seen from the direction of an arrow along the line b—b of FIG. 1A.
Figure 1C:
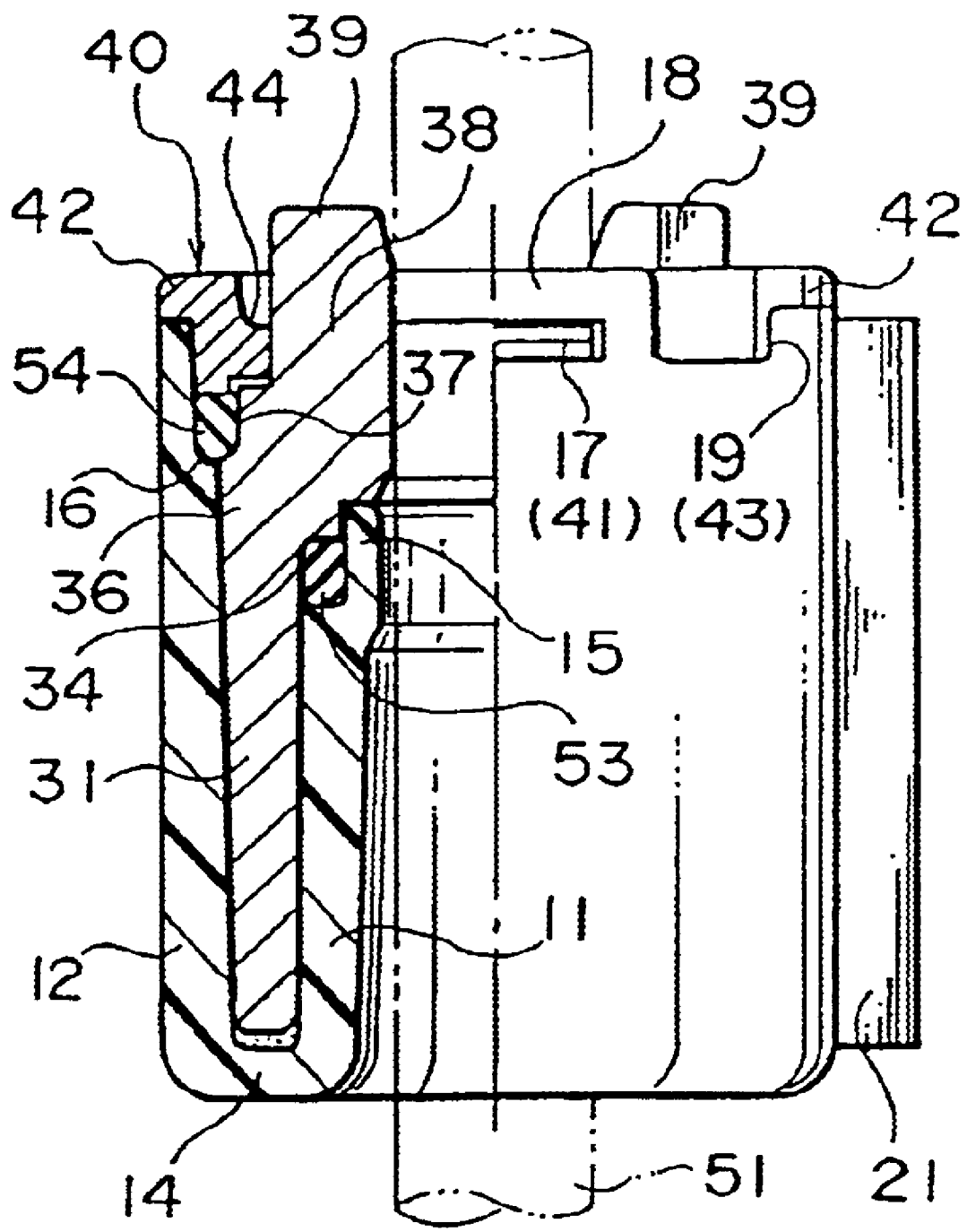
FIG. 1C is a semi-longitudinal sectional view of the damper as seen from the direction of an arrow along the line c—c of FIG. 1A.
Figure 2:
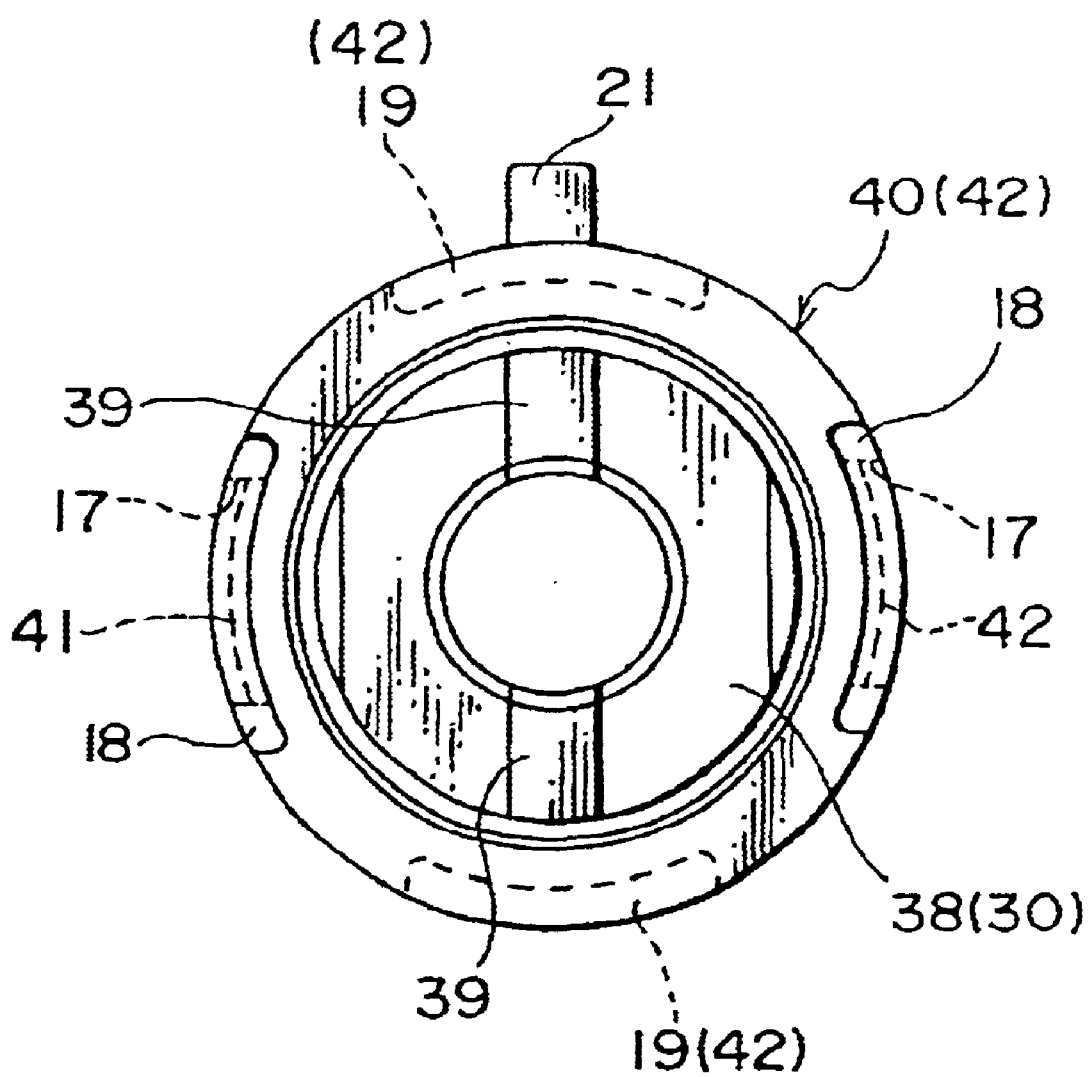
FIG. 2 is a plane view of the damper.

With reference to the drawings, a plurality of embodiments will be explained hereinafter. However, it should be understood that the present invention is not meant to be limited to these embodiments.

First, with reference to FIGS. 1A to 6B, a description of a first embodiment of the present invention will be given hereinafter.

A plastic housing 10 is provided with an inner cylinder 11, an outer cylinder 12, and a bottom wall 14 for closing one end portion of an annular space 13 (a lower end portion in FIGS. 1B and 1C) between the inner cylinder 11 and the outer cylinder 12, which are formed so as to be integrated with one another. A shaft member 51 is inserted into an insertion hole at the inside of the inner cylinder 11. A viscous fluid 52 such as a silicone oil is contained in the annular space 13. Hereinafter, the annular space 13 is also referred to as an oil reservoir.

The inner cylinder 11 has a small diameter cylindrical portion at the upper end thereof. A small diameter annular step portion 15 is formed at the outer periphery of the small diameter cylindrical portion. A large diameter annular step portion 16 is formed at the inner peripheral upper end portion of the outer cylinder 12, and has a small thickness.

A plastic rotor 30 has a damping cylinder 31 which is inserted into the oil reservoir 13, and a cylindrical head 35. The damping cylinder 31 and the cylindrical head 35 are formed integrally with each other. The insertion hole which is provided at the inside of the cylindrical head 35 and into which the shaft member 51 is inserted has an inner diameter which is smaller than that of a through hole which is formed at the inside of the inner cylinder 11. The cylindrical head 35 has an oval portion 38, a small diameter outer peripheral portion 37, and a large diameter outer peripheral portion 36.

The large diameter outer peripheral portion 36 is fitted into the inner periphery of the outer cylinder 12. The small diameter outer peripheral portion 37 faces the large diameter annular step portion 16 of the outer cylinder 12 through an annular seal member 54. The oval portion 38 has a diameter which is smaller than the small diameter outer peripheral portion 37, and a pair of flat surfaces which are relatively parallel to each other are formed at the sides of the oval portion 38. Protrusions 39, which protrude upwardly from the upper end portion of the outer cylinder 12 when the rotor 30 is set, are provided at the upper surface of the oval portion 38.

The damping cylinder 31 has at the sides thereof a pair of flat surfaces 32 parallel to both flat surfaces of the oval portion 38. An elongated hole 33 is formed so as to penetrate each of the flat surfaces 32 in the longitudinal direction of the flat surface 32. Due to the presence of the flat surfaces 32 and the elongated holes 33, when the damping cylinder 31 is set in the annular space 13, more gaps can be formed to contain the viscous fluid 52 therein so that an excellent damping effect can be obtained.

An annular seal member 53 is interposed between the annular step portion 34 of the damping tube potion 31 and the small diameter annular step portion 15 of the inner cylinder 11.

As shown in FIG. 4, each of the sealing members 53 and 54 is formed by an ordinary O ring whose cross section is circular. When the sealing members 53 and 54 are mounted, they are compressed, and thereby deform into an oval or elongated circular cross-sectional configuration. Accordingly, depending upon the circumstances, there is a possibility that the sealing members 53 and 54 may make excessively close contact with the rotor 30 and thereby rotate together with the rotor 30 during the rotation of the rotor 30. Therefore, without deteriorating the sealing performance, the sealing members 53 and 54 must be structured in order to reduce a contact resistance thereof with respect to the inner peripheral surface of the annular step portion 34 of the rotor 30.

Figure 5A:
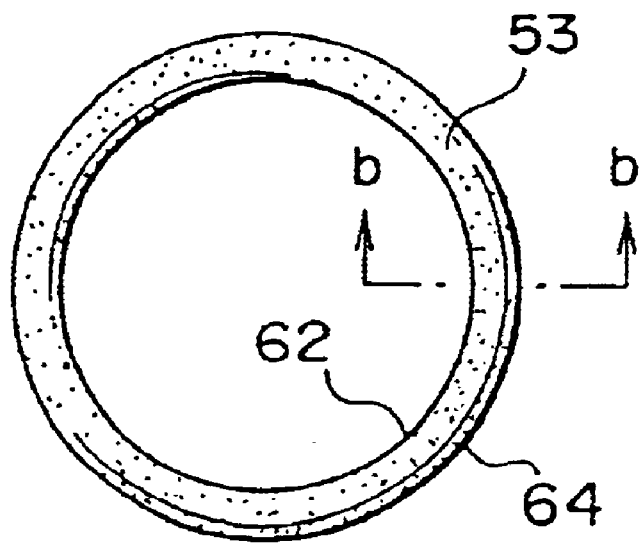
FIG. 5A is a plane view of a sealing member.
Figure 5B:
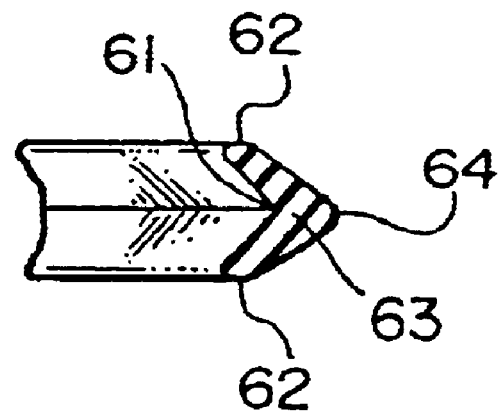
FIG. 5B is an expanded sectional view of the sealing member which is cut along the line b—b of FIG. 5A.
Figure 6A:
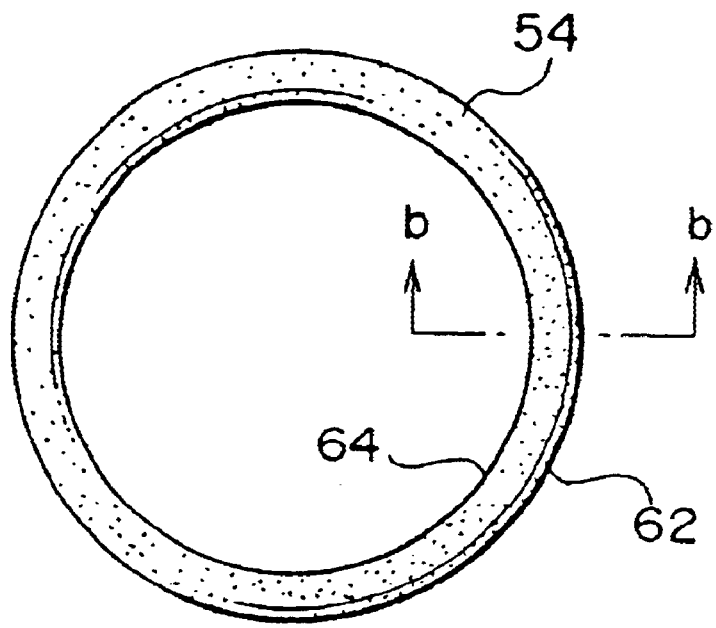
FIG. 6A is a plane view of another sealing member.
Figure 6B:
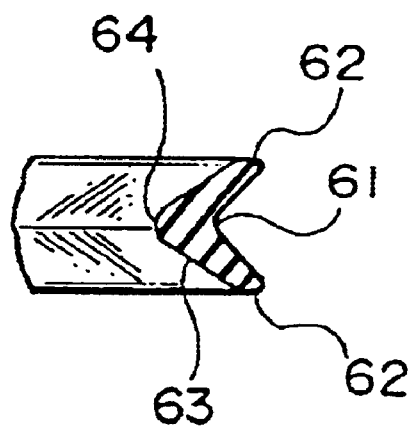
FIG. 6B is an expanded sectional view of the sealing member which is cut along the line b—b of FIG. 6A.
Figure 7A:
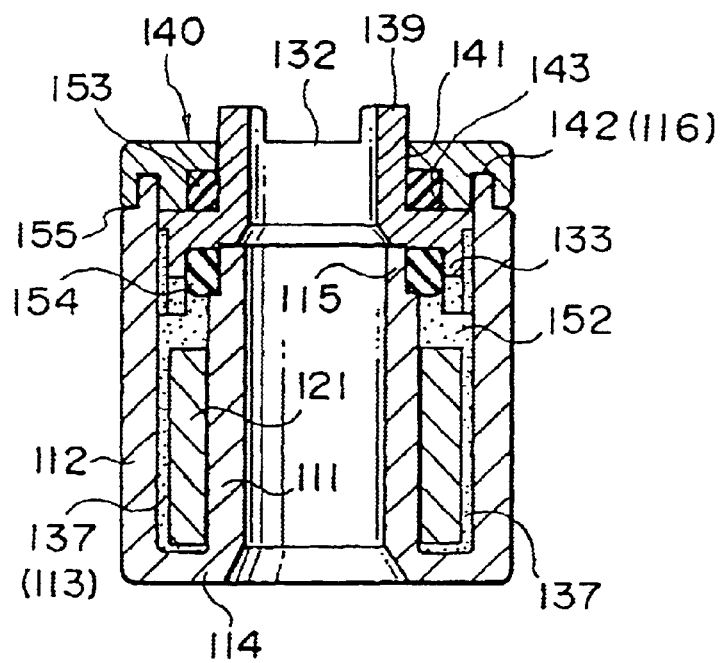
FIG. 7A is a longitudinal sectional view of a damper according to a second embodiment of the present invention.
Figure 7B:
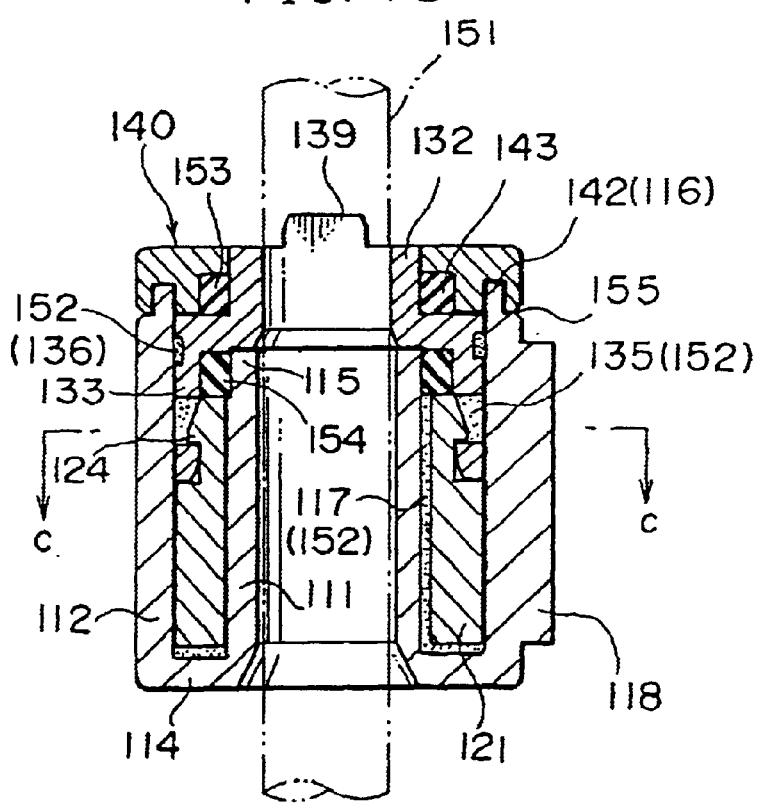
FIG. 7B is a longitudinal sectional view of the damper of FIG. 7A which is cut at another sectional position.
Figure 9A:
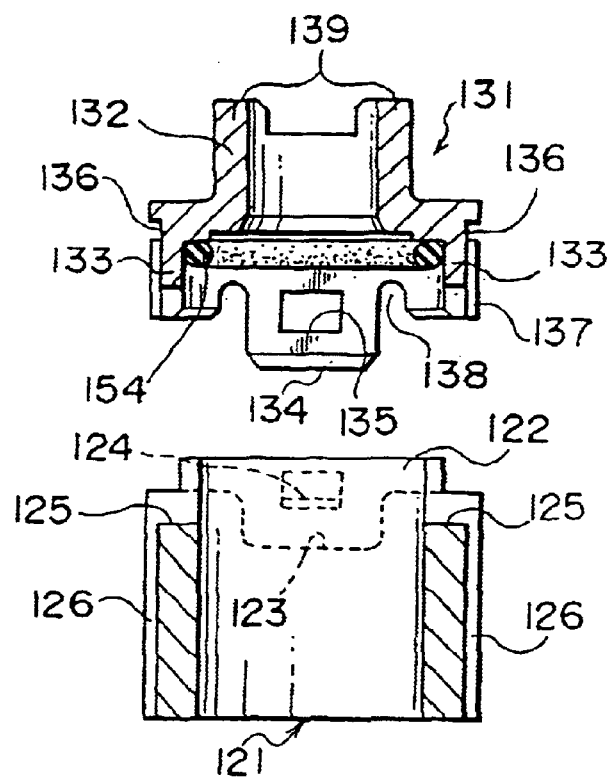
FIG. 9A is a longitudinal sectional view of a rotor in an exploded state.
Figure 9B:
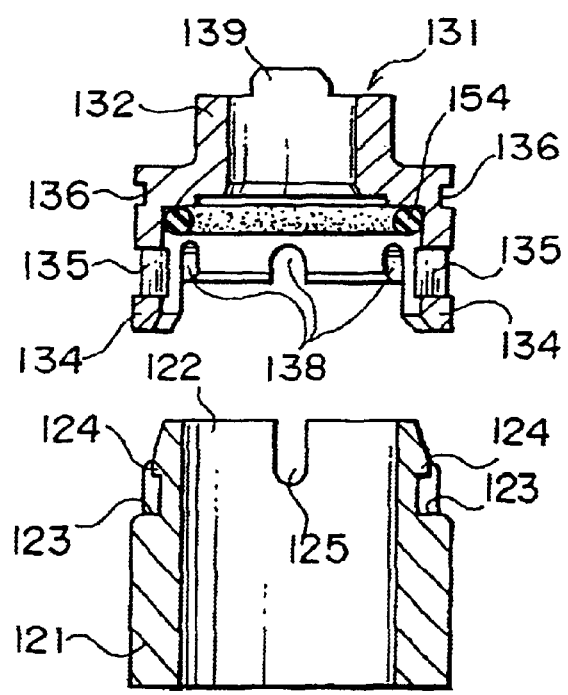
FIG. 9B is a longitudinal sectional view of the rotor which is in the exploded state and which is cut at another sectional position.
Figure 10A:
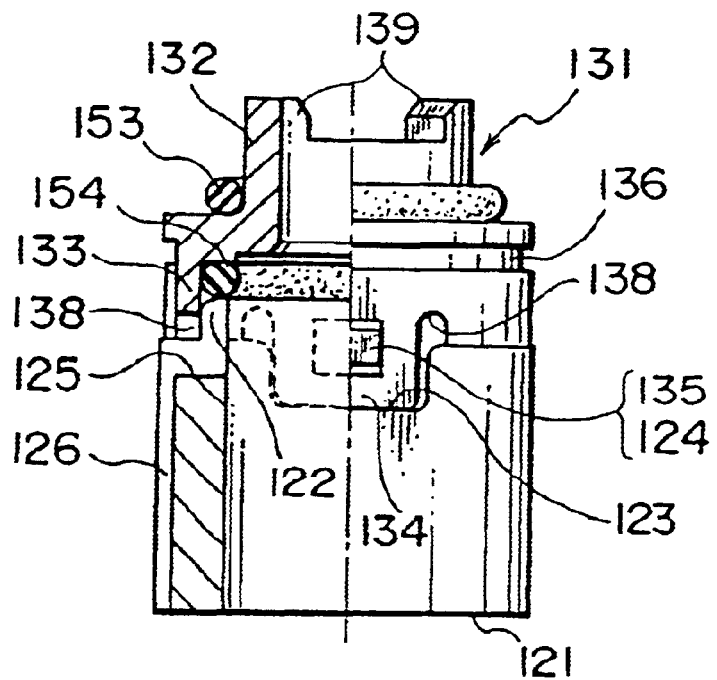
FIG. 10A is a semi-longitudinal sectional view of a rotor in an assembled state.
Figure 10B:
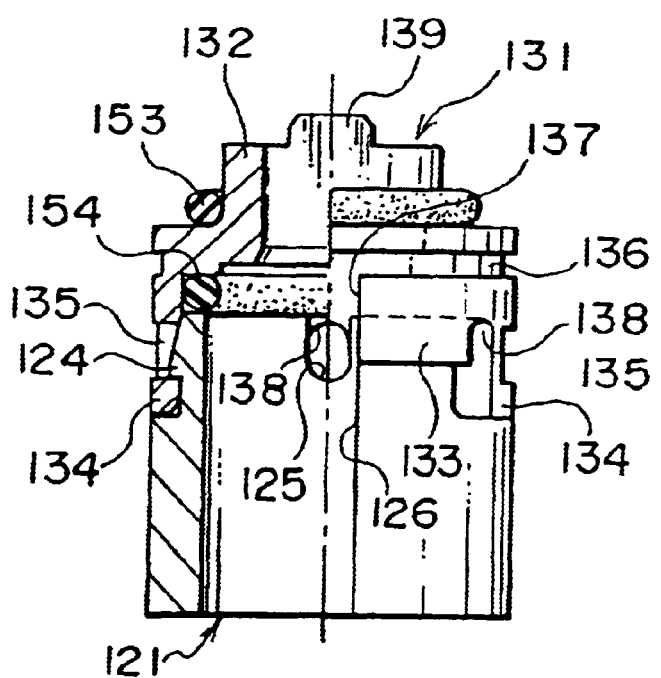
FIG. 10B is a longitudinal sectional view of the rotor which is in the assembled state and which is cut at another sectional position.

Thus, in order to reduce the contact resistance of each of the sealing members 53 and 54 with respect to the rotation of the rotor 30 while maintaining a constant sealing effect (or performance) from the sealing members 53 and 54, as shown in FIGS. 5A to 6B, each of the sealing members 53 and 54 is preferably formed into a V-shaped cross-sectional configuration. Namely, as shown in FIGS. 5A and 5B, the sealing member 53 which makes contact with the inner peripheral surface of the rotor 30 is formed in a V-shaped cross section which is closed toward the outer periphery of the sealing member 53. As shown in FIGS. 6A and 6B, the sealing member 54 which makes contact with the outer peripheral surface of the rotor 30 is formed in a V-shaped cross section which is closed toward the inner periphery of the sealing member 54.

When the sealing members 53 and 54 make contact with the housing 10, since the opened portion of the V-shaped cross section of each of the sealing members 53 and 54 is compressed and makes contact with the housing 10, the area of each of the sealing members 53 and 54 that make contact with the housing 10 is large. Conversely, when the sealing member 53 and 54 make contact with the rotor 30, since the closed portion of the V-shaped cross section of each of the sealing members 53 and 54 is compressed and makes contact with the rotor 30, the area of each of the sealing members 53 and 54 that makes contact with the rotor 30 is small. Therefore, the larger the force by which the housing 10 is held not to cause the sealing members 53 and 54 to rotate, the smaller the resistance force of the sealing members 53 and 54 with respect to the rotation of the rotor 30. Accordingly, both a rotation starting torque of the rotor 30 and a damping force which damps the rotor 30 during its rotation thereby stopping the rotation may be small.

Saw-tooth shaped detention pawls 41 are provided at the outer periphery of a plastic annular cap 40 so as to extend therefrom. A pair of elongated engaging holes 17 are provided in the circumferential direction of the large diameter annular step portion 16 of the outer cylinder 12 so as to oppose each other in a diametrical direction of the outer cylinder 12.

When the cap 40 is mounted on the large diameter annular step portion 16 of the outer cylinder 12, the detention pawls 41 of the cap 40 engage with the engaging holes 17 so that the rotor 30 and the sealing member 54 are reliably held in the housing 10.

The upper end portion of the large diameter annular step portion 16 of the outer cylinder 12, into which the cap 40 is pressed from an opening end of the housing 20 and which does not include arcuate projections 18 having the aforementioned pair of the engaging holes 17, forms concavo-convex interlocking portions 19. In order to correspond to these concavo-convex interlocking portions 19, a pair of arcuate extending portions 42, which are spaced apart from the detention pawls 41 in the circumferential direction of the cap 40 and which are located above the concavo-convex interlocking portions 19, are provided at the outer peripheral upper end portion of the cap 40 so as to face each other in the diametrical direction. Due to the engagement of the detention pawls 41 with the engaging holes 17, the cap 40 does not disengage upwardly from the outer cylinder 12 of the housing 10. The aforementioned engagement and the interlocking operation of the concavo-convex interlocking portions 19 relative to each other as well as that of concavo-convex interlocking portions 43 relative to each other prevent the cap 40 from rotating with respect to the outer cylinder 12 of the housing 10.

The cap 40 is provided with an annular extending portion 44 and a downward cylindrical portion 45. The annular extending portion 44 is extended so as to be spaced apart from the inner periphery of the cap 40 to the upper surface of the small diameter outer peripheral portion 37 of the rotor 30, and prevents the rotor 30 having the damping cylinder 31 inserted into the oil reservoir 13 of the housing 10 from disengaging upwardly from the housing 10. The downward cylindrical portion 45 presses the sealing member 53 down, which sealing member 53 has been compressed between the small diameter outer peripheral portion 37 of the rotor 30 and the large diameter annular step portion 16 at the inner peripheral upper end portion of the outer cylinder 12 of the housing 10, and prevents the sealing member 53 from disengaging upwardly.

When assembling the damper, the oil reservoir 13 is filled with the viscous fluid 52, and the sealing member 53 is fitted onto the small diameter annular step portion 15 at the outer peripheral upper end portion of the inner cylinder 11.

The sealing member 54 is fitted onto the small diameter outer peripheral portion 37 of the cylindrical head 35 of the rotor 30. The damping cylinder 31 is inserted into the oil reservoir 13. At the same time, the sealing member 53 is compressed between the small diameter annular step portion 15 at the outer peripheral upper end portion of the inner cylinder 11 and the annular step portion 34 at the inner peripheral upper end portion of the damping cylinder 31 of the rotor 30. Further, the sealing member 54 is compressed between the small diameter outer peripheral portion 37 of the cylindrical head 35 of the rotor 30 and the large diameter step portion 16 at the inner peripheral upper end portion of the outer cylinder 12. As a result, the viscous fluid 52 with which the oil reservoir 13 is filled is prevented from leaking outside of the oil reservoir 13 by the damping cylinder 31 of the rotor 30 which has been inserted into the oil reservoir 13.

The cap 40 is pressed into the large diameter annular step portion 16 at the inner peripheral upper end portion of the outer cylinder 12. The detention pawls 41 which extend from the outer periphery of the cap 40 engage with the engaging holes 17 of the large diameter annular step portion 16 so that the rotor 30 and the sealing member 54 are prevented from disengaging from the housing 10. The engagement of the detention pawls 41 with the engaging holes 17 as well as the interlocking operation of the concavo-convex interlocking portions 43 relative to each other and that of the concavo-convex interlocking portions 19 relative to each other prevent the cap 40 from rotating with respect to the housing 10.

The damper of the first embodiment of the present invention can be applied to an assist grip which is rotatably mounted to upper side walls of window panes at the interior of a vehicle. Namely, because the damper of the present embodiment is built into the assist grip, when the assist grip, which has once rotated in a direction separate from the side walls, returns to the original position at which the assist grip is mounted, the assist grip can be damped so that the return movement of the assist grip can be performed not abruptly but slowly and gently.

Thus, for example, each of the end portions of the shaft member 51 which is passed through the center of the inner cylinder 11 of the housing 10, a hollow portion of the cylindrical head 35 of the rotor 30, and the cap 40 is supported by a pair of brackets (not shown in the drawings) which are fixed to the side walls of a vehicle compartment. A shaft receiving portion (not shown in the drawings) which is provided at the inside of one end portion of the assist grip is passed through the cap 40. Protrusions 39 of the cylindrical head 35 of the rotor 30 which protrude outwardly from the cap 40 are inserted into holes provided at the aforementioned shaft receiving portion. A key-shaped protrusion 21, which is disposed so as to protrude from the outer periphery of the outer cylinder 12 of the housing 10 in the axial direction thereof, engages with a portion at a vehicle body side so that the housing 10 is fixed to the vehicle body thereby allowing the rotor 30 to rotate integrally with the assist grip. Further, the other end portion of the assist grip is also mounted rotatably to the vehicle body. A spring, for example, a coil spring for rotating and urging the assist grip until it abuts the side walls is accommodated at the inside portion of the other end portion of the assist grip.

In this way, when the housing 10 is fixed to the vehicle body and the rotor 30 thereby rotates, the damping cylinder 31 of the rotor 30 must rotate in resistance to a viscous resistance of the viscous fluid 52 with which the oil reservoir 13 of the housing 10 is filled. Accordingly, the damping cylinder 31 can damp the external force for rotating the rotor 30. Likewise, when the damping cylinder 31 is used for another purpose to fix the rotor 30 and rotate the housing 10, the damping cylinder 31 can damp the external force for rotating the housing 10.

At the lower portion of the small diameter annular step portion 15 of the inner cylinder 11 of the housing 10, flat surfaces 22 are formed at the outer periphery of the inner cylinder 11 so as to face each other in the diametrical direction of the inner cylinder 11, thereby allowing the oil reservoir 13 to contain therein a greater amount of the viscous fluid 52 and improve the effect of damping.

As described above, in the aforementioned first embodiment of the present invention, since the cap 40, which engages with the opening end portion of the housing 10 and which prevents the rotor 30 and the sealing member 53 and 54 from disengaging from the housing 10, is provided independently of the rotor 30 and is structured not to rotate, the sealing performance of the sealing members 53 and 54 can be improved thereby reliably preventing leakage of the viscous fluid in the oil reservoir 13 and stabilizing the damping torque.

As compared to a structure of a damper in which a rotor and a cap are formed integrally with each other, since the damper of the present invention does not require excessively high precision in producing the parts, it can be manufactured inexpensively.

Next, with reference to FIGS. 7A to 10B, a description of a damper according to a second embodiment of the present invention will be given hereinafter.

In a plastic housing 110, an inner cylinder 111, an outer cylinder 112, and a bottom wall 114 which blocks the lower end portion of an oil reservoir 113 which oil reservoir is an annular space formed between the inner cylinder 110 and the outer cylinder 112 are disposed integrally and concentrically with one another. A shaft member 151 is passed through an opening portion (i.e., the inner periphery of the inner cylinder 111) and a viscous fluid 152 such as a silicone oil is contained in the oil reservoir 113. The outer cylinder 112 is longer than the inner cylinder 111 and protrudes upwardly from the upper end portion of the inner cylinder 111.

A small diameter annular step portion 115 is formed at the outer peripheral upper end portion of the inner cylinder 111. Further, a thin annular wall 116 protrudes upwardly from the inner peripheral upper end portion of the inner cylinder 112.

A plastic rotor 120 has a damping cylinder 121 and a cylindrical head 131. The damping cylinder 121 rotates in the oil reservoir 113. The cylindrical head 131 is accommodated at the upper end inside portion of the outer cylinder 112, has a hollow cylindrical portion 132 as an opening portion into which a shaft member 151 which has been passed through the inner cylinder 111 of the housing 110 is inserted, and rotates integrally with the damping cylinder 121. The hollow cylindrical portion 132 of the cylindrical head 131 has an inner diameter which is the same as the inner cylinder 111 of the housing 110.

The cylindrical head 131 is provided with a downward cylinder 133 which extends downwardly from the inner periphery of the outer cylinder 112, and a pair of arcuate projections 134 which are disposed so as to extend downwardly from the downward cylinder 133 and face each other in the diametrical direction of the downward cylinder 133. The damping cylinder 121 has a thin upward cylinder 122 at the upper half potion thereof along the outer periphery of the inner cylinder 111. The upward cylinder 122 is fitted into the inner periphery of the downward cylinder 133 of the cylindrical head 131 at the inside of the oil reservoir 113 of the housing 110. Namely, the sum of a thickness of the upward cylinder 122 and a thickness of the downward cylinder 133 is equal to a radial distance of the oil reservoir 113 between the outer cylinder 112 and the inner cylinder 111. At the outer periphery of the damping cylinder 121, a pair of groove portions 123 are disposed so as to extend downwardly from the upward cylinder 122. The pair of the groove portions 123 face each other in the diametrical direction of the damping cylinder 121. The downward arcuate projections 134 of the cylindrical head 131 are fitted onto the pair of the groove portions 123. Outward detention pawls 124 are provided so as to protrude respectively from the groove portions 123. In order to correspond to these outward detention pawls 124, engaging holes 135 with which the detention pawls 124 engage are provided respectively at the arcuate projections 134.

In order to increase the amount of the viscous fluid 152 in the oil reservoir 113 and improve the damping force of the rotor 120, there are provided at the damping cylinder 121 downward notches 125 in the diametrical direction of the damping cylinder 121 which direction is orthogonal to the direction of the grooves 123 having the outward detention pawls 124. The downward notches 125 extend from the upper end portion of the upward cylinder 122 and are longer than the upward cylinder 122. At the lower portion of the upward cylinder 122, there are provided longitudinal grooves 126 at the outer periphery of the damping cylinder 121. The longitudinal grooves 126 have upper end portions that communicate with the aforementioned downward notches 125. Further, at the outer periphery of the cylindrical head 131, an annular groove 136 is provided so as to be apart from the upper surface of the cylindrical head 131 to the lower portion thereof. Longitudinal grooves 137 having upper end portions which communicate with the aforementioned annular groove 136 are provided in the diametrical direction of the cylindrical head 131, which direction is orthogonal to the direction of the arcuate projections 134. Upward notches 138 are provided at the lower end portions of the longitudinal grooves 137.

The viscous fluid 152 with which the oil reservoir 13 has been filled is poured into the notches 125 and 138, the longitudinal grooves 126 and 137, and the annular groove 136, thus increasing the amount of the viscous fluid 152. Further, when the rotor 120 is rotated, since the rotor 120 must rotate in resistance to the viscous fluid 152 with which the notches 125 and 138, the longitudinal grooves 126 and 137, and the annular groove 136 have been filled, the damping force can be improved. For a similar purpose, a plurality of longitudinal grooves 117 (three in the present second embodiment) are provided at the outer periphery of the inner cylinder 111 of the housing 110 so as to be spaced from each other at an equal distance in the circumferential direction (see FIG. 7C).

A plastic cap 140 has an inner peripheral portion 141, which is a relatively thick annular plate, and through which the hollow cylindrical portion 132 of the cylindrical head 131 is passed, whose outer diameter is the same as that of the outer cylinder 112 of the housing 110. At the bottom surface of the cap 140, there are provided an annular groove 142 which receives an annular wall 116 which protrudes from the inner peripheral upper end portion of the outer cylinder 112, and an annular concave portion 143 around the inner peripheral portion 141.

In order to receive a rotating force, the rotor 120 has a pair of upward protrusions 139 which protrude from the upper end portion of the cylindrical head 131 and which face each other in the diametrical direction of the cylindrical head 131. In order to prevent the rotation of the housing 110, a protrusion 118 is provided axially at the outer periphery of the outer cylinder 112 of the housing 110.

As shown in FIG. 8 to FIG. 10B, in order to assemble an oil damper, the cylindrical head 131 and the damping cylinder 121 in an exploded state are connected integrally to each other and thereby form the rotor 120. A second sealing member 154 such as an O ring is fitted into the inner periphery of the downward cylinder 133 of the cylindrical head 131. Directions of the pair of the arcuate projections 134 which extend downwardly from the cylindrical head 131 and which face each other in the diametrical direction of the cylindrical head 131 and those of the pair of the groove portions 123 of the damping cylinder 121 are corresponded to each other so as to press the cylindrical head 131 and the damping cylinder 121 to each other. Therefore, the arcuate projections 134 of the cylindrical head 131 are slipped into the groove portions 123 of the damping cylinder 121 and are lifted over the detention pawls 124, while they are bending outwardly, and the engaging holes 135 engage with the detention pawls 124. Accordingly, each of the arcuate projections 134 returns to its original straight shape at the inside of each of the groove portions 123. At the upper end portion of the upward cylinder 122 of the damping cylinder 121, the second sealing member 154 which has been fitted into the inner periphery of the downward cylinder 133 of the cylindrical head 131 is pressed onto the bottom surface at the inner peripheral upper end portion of the downward cylinder 133. In this way, the cylindrical head 131 and the damping cylinder 121 are integrated with each other so as to form the rotor 120, and hold a sealing member 154.

Next, the oil reservoir 113 of the housing 110 is filled with a predetermined amount of the viscous fluid 152. While the damping cylinder 121 of the rotor 120 is inserted into the oil reservoir 113, the rotor 120 is pushed into the housing 110 and accommodated therein. Before or after the insertion of the damping cylinder 121 and the accommodation of the rotor in the housing 110, a first sealing member 153 is fitted onto the outer periphery of the hollow cylindrical portion 132 of the cylindrical head 131. This first sealing member 153 may be the same as the second sealing member 154. Accordingly, the second sealing member 154, which has been fitted into the inner periphery of the downward cylinder 133 of the cylindrical head 131, and which has been pressed onto the bottom surface at the inner peripheral upper end portion of the downward cylinder 133 at the upper end portion of the upward cylinder 122 of the damping cylinder 121, is compressed around the small diameter annual step portion 115 at the outer peripheral upper end portion of the inner cylinder 111 of the housing 110. Accordingly, the viscous fluid 152 is prevented from leaking outside from the inner periphery of the hollow cylindrical portion 132 of the cylindrical head 131.

While the inner peripheral portion 141 of the cap 140 is fitted onto the outer periphery of the hollow cylindrical portion 132 of the cylindrical head 131, the annular groove 142 of the cap 140 is fitted onto a thin annular wall 116 which protrudes from the inner peripheral upper end portion of the outer cylinder 112 of the housing 110 so that the cap 140 is put on top of the housing 110. Accordingly, the first sealing member 153 which has been fitted onto the hollow cylindrical portion 132 of the cylindrical head 131 is compressed at the inside of the annular concave portion 143 at the inner periphery of the cap 140 so that the viscous fluid 152 is prevented from leaking outside form the outer periphery of the hollow cylindrical portion 132.

A welding sealing portion 155 is formed at an annular contact portion between the outer peripheral lower end portion of the cap 140 and the outer peripheral upper end portion of the outer cylinder 112 of the housing 110 by using an appropriate welding means such as a high frequency welding. The welding sealing portion 155 prevents the cap 140 from disengaging from the housing 110 thus preventing leakage of the viscous fluid 152 from the annular contact portion.

In the same manner as the damper disclosed in German Utility Model Application No. 29,604,260 U1, the damper of the present embodiment can be applied to an assist grip which is rotatably mounted to a passenger seat of a vehicle compartment or to upper side walls of the left and right window panes at a vehicle rear seat.

For example, both end portions of the shaft member 151 which is passed through the center of the inner cylinder 111 of the housing 110, the hollow cylindrical portion 132 of the cylindrical head 131 of the rotor 120, and the cap 140 are respectively supported by a pair of brackets (not shown in the drawings) fixed to the side walls of the vehicle compartment. A shaft receiving portion (not shown in the drawings) which is provided at the inside of one end portion of the assist grip is passed through the cap 140 in the vicinity thereof. The protrusions 139 of the cylindrical head 131 of the rotor 120, which protrude outwardly from the cap 140, are inserted into holes which are formed at the aforementioned shaft receiving portion. The protrusion 118 which is provided so as to protrude along the axial direction of the outer cylinder 112 at the outer periphery thereof is engaged with a portion at the vehicle body side. Accordingly, the housing 110 is fixed to the vehicle body so that the rotor 120 is made to rotate together with the assist grip.

The other end portion of the assist grip is rotatably mounted to the vehicle body. A spring, for example, a coil spring which rotates and urges the assist grip until it abuts the side walls of the vehicle body is accommodated at the inside of the other end portion.

Thus, when the housing 110 is fixed and the rotor 120 is rotated, since the damping cylinder 121 of the rotor 120 must rotate in resistance to the viscous resistance of the viscous fluid 152 with which the oil reservoir 113 is filled, the damping cylinder 121 can damp the external force for rotating the rotor 120. Likewise, when the rotor 120 is fixed and the housing 110 is rotated, the damping cylinder 121 can damp the external force for rotating the housing 110.

As described above, in the damper according to the second embodiment of the present invention, there is no need to provide an annular step portion at the inner cylinder 111 and the outer cylinder 112 of the housing 110 to hold each of the sealing members 153 and 154. Accordingly, the outer cylinder 112 and the inner cylinder 111 of the housing 110 can be made thinner so that the damper can be made compact and light. Further, since the cap 140 which is provided independently of the rotor 120 does not rotate, the sealing performance improves thereby stabilizing the torque performance. Moreover, since the damper of the present invention does not require excessively high precision in producing the parts, it is advantageous in terms of manufacturing costs. The damper of the present invention is practical because individual components have excellent molding performance, and the overall structure thereof can be facilitated and simplified. Since the first and second sealing members 153 and 154 can be made from the same materials, the damper of the present invention is extremely advantageous in terms of parts control and manufacturing costs.

Lastly, with reference to FIG. 11, an example of an assist grip into which the damper of the present invention is built will be simply explained hereinafter.

Figure 11:
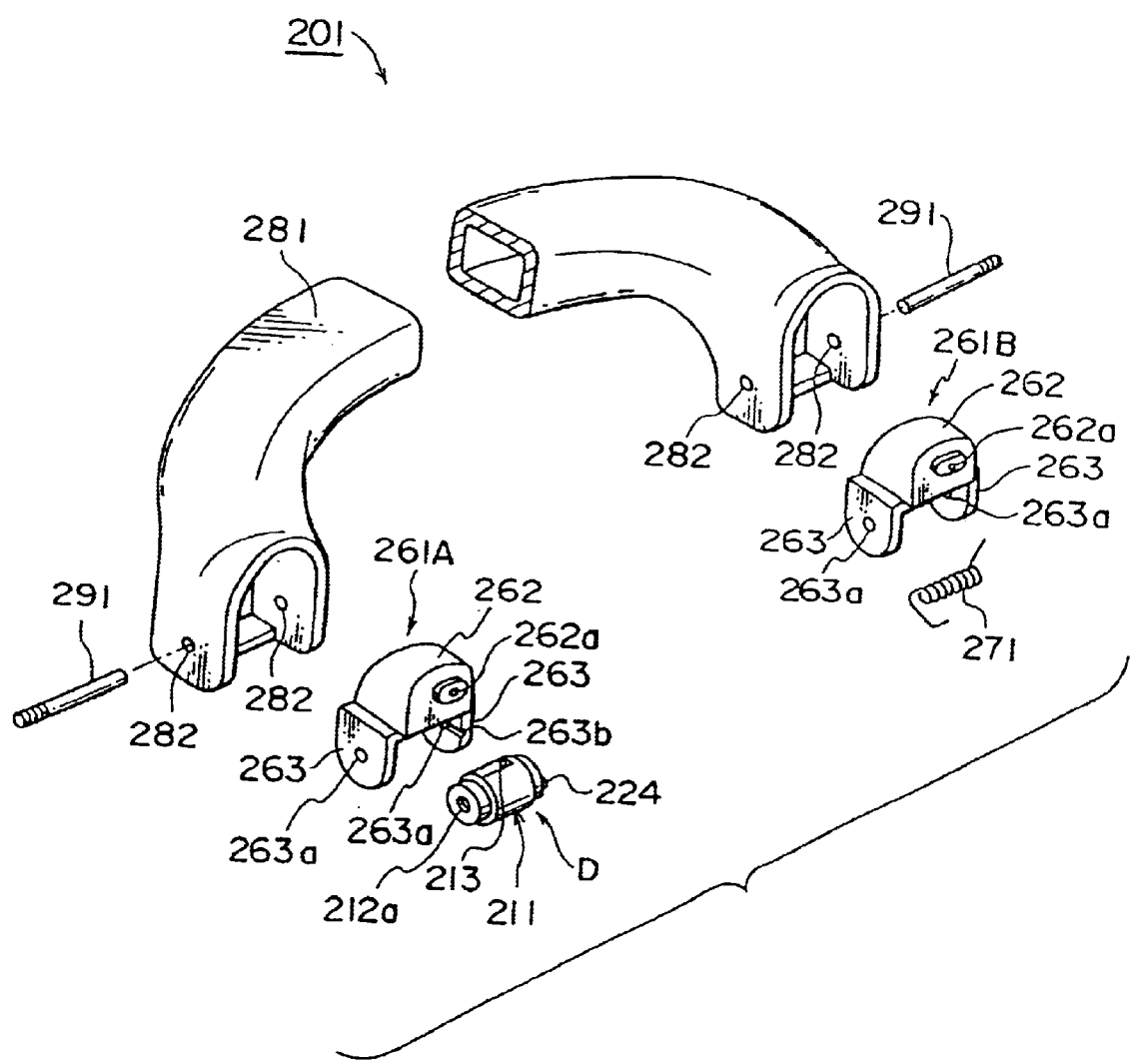
FIG. 11 is an exploded perspective view of an assist grip according to the present invention.

An assist grip 201 which is shown in FIG. 11 has a C-shaped grip 281, a pair of brackets 261A and 261B for mounting the grip 281, supporting shafts 291 for mounting the grip 281, an oil cylindrical rotational damper D, and a torsion spring 271 which urges the grip 281 to a return position (initial position).

Each of the pair of the brackets 261A and 261B has a mounting portion 262 having a mounting hole 262a, and shaft supporting holes 263a for supporting the supporting shafts 291, and is structured by a pair of supporting portions 263 which extend downwardly from both end portions of the mounting portion 262 and which face each other.

A groove 263b with which an engaging protrusion 224 of the damper D engages is provided at the inside of one of the supporting portions 263 of the bracket 261A. The groove 263b is connected to the shaft support hole 263a.

A pair of insertion holes 282 are formed at each of the end portions of the grip 281. The supporting shafts 291 are inserted into the insertion holes 282. Further, a fitting opening (or a fitting concave portion) is provided at the end portion of the grip 281 at the side corresponding to the bracket 261A. A protrusion of the damper D is fitted into the fitting opening.

An example in which the assist grip 201 having the above-described structure is mounted near the upper portion of the window pane of a vehicle interior portion (not shown in the drawings) will be explained hereinafter.

Each of the bracket 261A and the bracket 261B is mounted to a predetermined position of the vehicle interior portion.

Next, the engaging protrusion 224 of the damper D is fitted into the bracket groove 263b so as to position the damper D between the supporting portions 263.

The protrusion 213a of the damper D is fitted into the fitting opening 283 at the end portion of the grip 281, the end portions of the grip 281 are positioned respectively so as to correspond to the brackets 261A and 261B. The supporting shaft 291 is inserted into the insertion hole 282, a hole 212a, an insertion hole, and the insertion hole 282 so that one of the end portions of the grip 281 is mounted to the bracket 261A so as to be rotatable.

Then, the supporting shaft 291 is inserted into the insertion hole 282, the torsion spring 271, and the insertion hole 282 so that the other end portion of the grip 281 is mounted to the bracket 261B so as to be rotatable. The torsion spring 271 functions to regularly urge the grip 281 to its return or initial position (or accommodating/storing position).

The movement of the assist grip 201 will be explained hereinafter.

During the use of the assist grip 201, when the grip 281 is pulled down, a housing 211 of the damper D rotates via the protrusion bar 213a which is fitted into the fitting opening. A rotation of an output shaft of the damper D is controlled by the engaging protrusion 224 which engages with the bracket groove 263b so that a rotation of the grip 281 is damped.

Accordingly, in a case in which the grip 281 is set in a released state, due to an urging force of the torsion spring 271, the grip 281 returns to its return position (initial position). Also, in this case, the return movement of the grip 281 is damped by the damper D.

As described above, in this assist grip 201, the damper D is disposed on the support shafts 291 so that a structure for supporting the grip 281 can be made compact, thus providing a reliable damping effect.

A structure in which the hole 212a and the insertion hole 221a are not provided at the damper D can be adopted.

A means for rotating the output shaft (rotor) 221 and the supporting shaft 291 integrally with each other is provided so that the damper D can be structured so as not to use the engaging protrusion 224. Further, instead of providing a protrusion of the damper D and the fitting opening, the contour of the peripheral wall 213 of the damper D is made to form a non-column shape so that the damper D can be structured to be able to rotate together with the grip 281.

What is claimed is:

1. A rotational damper, comprising:
   a housing having an inner cylinder and an outer cylinder disposed concentrically with each other and an annular space formed between the inner cylinder and the outer cylinder containing a viscous fluid;
   a cylindrical rotor accommodated in said housing and which receives a damping action from the viscous fluid, wherein the cylindrical rotor is hollow throughout the length thereof;
   a ring-shaped sealing member for preventing viscous fluid leakage; and
   an annular cap provided independently of said rotor and mounted to said housing, and which retains said rotor and said sealing member in said housing.

2. The rotational damper of claim 1, wherein said housing includes an annular step portion, and said sealing member mounts on the annular step portion.

3. The rotational damper of claim 1, wherein said housing includes an open end portion, and an engaging portion provided threat, which engages with said cap and which holds the same.

4. The rotational damper of claim 1, wherein said outer cylinder of said housing includes an end having an outer peripheral portion and said annular cap includes an outer peripheral portion, with said outer peripheral portions being jointed and sealed to one another.

5. A rotational damper, the damper comprising:
   a housing having an annular space containing a viscous fluid;
   a cylindrical rotor accommodated in said housing and which receives a damping action from the viscous fluid, wherein the cylindrical rotor comprises a cylindrical head, and wherein the cylindrical rotor is hollow throughout the length thereof;
   an annular cap provided independently of said rotor and engaged with the housing, which retains said rotor in said housing;
   a ring-shaped first sealing member disposed between said rotor and said cap; and
   a ring-shaped second sealing member disposed between said rotor and said housing.

6. The rotational damper of claim 5, wherein said housing includes an inner cylinder and an outer cylinder, with said annular space formed between said inner cylinder and said outer cylinder.

7. The rotational damper of claim 6, wherein said inner cylinder and said outer cylinder are disposed concentrically with each other.

8. The rotational damper of claim 5, wherein said annular cap includes a central aperture and said cylindrical rotor is provided with a cylindrical head, having opposite end sides with a first hollow cylindrical portion at one end side, said first hollow cylindrical portion being passed through said central aperture of said annular cap.

9. The rotational damper of claim 8, wherein said first sealing member is disposed between said first hollow cylindrical portion and the central aperture of said annular cap.

10. The rotational damper of claim 8, wherein said cylindrical rotor includes a second hollow cylindrical portion at the other end side of said cylindrical head, and a portion of said inner cylinder of said housing enters into said second hollow cylindrical portion.

11. The rotational damper of claim 10, wherein said second sealing member is disposed between said second hollow cylindrical portion and said inner cylinder of said housing.

12. The rotational damper of claim 11, wherein said second sealing member is disposed between said second hollow cylindrical portion and a damping cylinder.

13. The rotational damper of claim 10, wherein said cylindrical rotor includes a damping cylinder provided independently of said cylindrical head.

14. The rotational damper of claim 13, wherein said second sealing member is disposed between said second hollow cylindrical portion and said damping cylinder.

15. The rotational damper of claim 13, wherein said damping cylinder is operably connected to said second hollow cylindrical portion.

16. The rotational damper of claim 5, wherein the first sealing member and the second sealing member are substantially the same with respect to at least size and shape.

17. An assist grip comprising:
(a) an arm supported so as to be rotatable between a first angular position during use and a second angular position during non-use, with said arm biased to return from the first angular position to the second angular position; and
(b) a damper for damping arm rotation, the damper including:
a housing containing a viscous fluid;
a cylindrical rotor accommodated in said housing for receiving a damping action from the viscous fluid;
an annular cap having a central aperture and provided independently of said rotor, and which retains said rotor in said housing;
a ring-shaped first sealing member disposed between said rotor and said cap; and
a ring-shaped second sealing member disposed between said rotor and said housing;
said cylindrical rotor including a cylindrical head having an end side with a first hollow cylindrical portion threat, said first hollow cylindrical portion being passed through the central opening of said annular cap, with said first sealing member disposed between said first hollow cylindrical portion and the central aperture of said annular cap.

18. The assist grip of claim 17, further comprising a shaft on which said arm is supported so as to be rotatable, wherein the damper is disposed on the shaft.

19. An assist grip comprising:
(i) an arm supported so as to be rotatable between a first angular position during use and a second angular position during non-use and biased to remain in said second angular position; and
(ii) a damper for damping rotation of said assist grip, said damper including:
a housing containing a viscous fluid, the housing having an inner cylinder;
a cylindrical rotor accommodated in said housing and for receiving a damping action from the viscous fluid;
an annular cap having a central aperture and provided independently of said rotor and which retains said rotor in said housing;
a ring-shaped first sealing member disposed between said rotor and said cap; and
a ring-shaped second sealing member disposed between said rotor and said housing;
said cylindrical rotor being provided with a cylindrical head, having opposite ends and having a first hollow cylindrical portion at one of the end sides, said first hollow cylindrical portion being passed through the central aperture of said annular cap;
said cylindrical rotor having a second hollow cylindrical portion at the other end side of said cylindrical head, and a portion of said inner cylinder of said housing entering into said second hollow cylindrical portion;
said cylindrical rotor having a damping cylinder provided independently of said cylindrical head; and
said second sealing member being disposed between said second hollow cylindrical portion and said damping cylinder.

20. The assist grip of claim 19, further comprising a shaft at which said assist grip is supported so as to be rotatable, said damper being disposed on said shaft.

21. A rotational damper, comprising:
a housing having an inner cylinder and outer cylinder disposed concentrically with each other and an annular space formed between the inner cylinder and the outer cylinder containing a viscous fluid;
a cylinder rotor accommodated in said housing and which receives a damping action from the viscous fluid, wherein the cylindrical rotor is hollow throughout the length thereof;
means for preventing viscous fluid leakage; and
an annular cap provided independently of said rotor and mounted to said housing, and which retains said rotor and said sealing member in said housing.

* * * * *